US012466528B2

(12) United States Patent
Tian et al.

(10) Patent No.: US 12,466,528 B2
(45) Date of Patent: Nov. 11, 2025

(54) AUTONOMOUS UNDERWATER VEHICLE (71) Applicant: HANGZHOU DIANZI UNIVERSITY, Hangzhou (CN)

(72) Inventors: Xiaoqing Tian, Hangzhou (CN); Haofan Ge, Hangzhou (CN); Huachen Pan, Hangzhou (CN); Honghua Chen, Hangzhou (CN); Xueting Zhang, Hangzhou (CN); Ming Lv, Hangzhou (CN); Zefei Zhu, Hangzhou (CN); Junyi Yang, Hangzhou (CN); Jingbiao Liu, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 17/928,274

(22) PCT Filed: Nov. 11, 2021

(86) PCT No.: PCT/CN2021/129926
§ 371 (c)(1),
(2) Date: Nov. 28, 2022

(87) PCT Pub. No.: WO2023/065423
PCT Pub. Date: Apr. 27, 2023

(65) Prior Publication Data
US 2024/0246649 A1 Jul. 25, 2024

(30) Foreign Application Priority Data
Oct. 22, 2021 (CN) .......................... 202111230127.9

(51) Int. Cl.
*B63G 8/00* (2006.01)
*B63C 11/52* (2006.01)

(52) U.S. Cl.
CPC .............. *B63G 8/001* (2013.01); *B63C 11/52* (2013.01); *B63G 2008/004* (2013.01)

(58) Field of Classification Search
CPC .......................... B62B 19/08; B62B 2035/007
See application file for complete search history.

(56) References Cited

U.S. PATENT DOCUMENTS 3,451,224 A * 6/1969 Colechia .................... B25J 5/00
901/41
3,550,386 A * 12/1970 Ballinger ................ B63C 11/48
414/732

(Continued)

FOREIGN PATENT DOCUMENTS

| CN | 106828838 A | 6/2017 |
| CN | 108045532 A | 5/2018 |

(Continued)

OTHER PUBLICATIONS

PCT Written Opinion and Search Results for PCT International Patent Application No. PCT/CN2021/129926.

*Primary Examiner* — Kayla Mccaffrey
(74) *Attorney, Agent, or Firm* — Olive Law Group, PLLC (57) ABSTRACT The present disclosure relates to the technical field of autonomous underwater vehicles, in particular to an unmanned cable-free operation type autonomous underwater vehicle. The unmanned cable-free operation type autonomous underwater vehicle includes a bow, a middle and a stern, each of the bow, the middle and the stern is of a hollow structure, the middle is provided with a manipulator lifting device and a cabin door opening and closing mechanism, the bow is provided with a first horizontal channel propeller and a first vertical channel propeller, and the stern is provided with two second vertical channel propellers and four main propellers. High-speed cruising of the unmanned cable-free operation type autonomous underwater vehicle can be (Continued)

achieved, and stable and precise hovering needed by the operation of the unmanned cable-free operation type autonomous underwater vehicle can also be achieved.

8 Claims, 5 Drawing Sheets

(56) References Cited

U.S. PATENT DOCUMENTS

| | | | | |
|---|---|---|---|---|
| 6,056,237 | A * | 5/2000 | Woodland | B64D 1/02 |
| | | | | 244/49 |
| 10,450,040 | B2 * | 10/2019 | Radford | B25J 9/0087 |
| 10,604,221 | B2 * | 3/2020 | Bonel | B63G 8/001 |
| 2017/0240257 | A1 * | 8/2017 | Brandt | B63G 8/001 |
| 2021/0155330 | A1 | 5/2021 | Mukaida et al. | |

FOREIGN PATENT DOCUMENTS

| | | | | |
|---|---|---|---|---|
| CN | 108860527 | A | | 11/2018 |
| CN | 109533239 | A | | 3/2019 |
| CN | 110386238 | A | | 10/2019 |
| CN | 111846170 | A * | 10/2020 | ............ B63C 11/52 |
| CN | 111645835 | A | | 11/2020 |
| EP | 0188459 | B1 * | 6/1985 | |
| RU | 2137659 | C1 * | 9/1999 | |
| RU | 2782037 | C1 * | 10/2022 | |

\* cited by examiner

AUTONOMOUS UNDERWATER VEHICLE

CROSS REFERENCE TO RELATED APPLICATIONS

This is a U.S. national stage patent application that claims priority to and the benefit of PCT International Patent Application No. PCT/CN2021/129926, filed on Nov. 11, 2021, which claims priority to and the benefit of Chinese Patent Application No. 2021112301279, filed on Oct. 22, 2021; the disclosures of which are incorporated by reference herein in their entireties.

TECHNICAL FIELD

The present disclosure relates to the technical field of autonomous underwater vehicles, in particular to an unmanned cable-free operation type autonomous underwater vehicle.

BACKGROUND ART

Conventional unmanned cable-free autonomous underwater vehicles (AUV) may be mainly divided into the following two types of a monitoring type and an operation type. Wherein the monitoring type autonomous underwater vehicle is mainly equipped with different sensors, which can directly measure relevant parameters, and it is only needed to limit proper speed, endurance mileage, installation positions of the sensors and the like; and the operation type autonomous underwater vehicle is affected by many factors, such as inherent endurance, self-balance and complex sea conditions, so that there are fewer related products around the world.

For the monitoring type AUV, such as an AUV for underwater detection, as disclosed in the Chinese patent with the application number of 202020449668.5, the thickness of a shell in a vertical face along the advancing direction of the AUV is smaller than that of the shell in a horizontal face. An underwater communication system is fixed to a top of a shell, and an energy system, a pressure-resistant detection system and a pressure-resistant control cabin are arranged in the shell; a retractable stabilizing wing is fixed on an outer surface of a tail part of the shell; four vector propellers are arranged on two sides of the shell. A control system of the AUV is arranged in the pressure-resistant control cabin; a shell of the pressure-resistant control cabin includes a column shell and a plurality of ribs, the ribs are distributed on an outer surface of the column shell, and the column shell includes an upper shell plate, a lower shell plate and a pressure reduction layer; an outer side wall of the upper shell plate and an inner side wall of the lower shell plate are parallel inclined planes. A gap is formed between the outer side wall of the upper shell plate and the inner side wall of the lower shell plate, and the pressure reduction layer is arranged in the gap. The pressure reduction layer is made of a buoyancy material, a damping material or a sound absorption material.

For the operation type AUV, such as an AUV manipulator system, as disclosed in the Chinese patent with the application number of 201810745727.0, the system includes three parts: an AUV body, an underwater manipulator and an auxiliary adjusting device. The AUV body is a cable-free autonomous underwater vehicle, its power system uses an under-actuated mode to control the attitude and movement of the AUV, and its drive system consists of single propellers and one cruciform rudder, which are mounted at a stern of the AUV body. The system uses the underwater manipulator with four degrees of freedom and five functions, the underwater manipulator consists of two rotative joints, two pendulum joints and one manipulator grasp. The auxiliary adjusting device is mounted under the AUV and is close to the stern. The device is driven by a lead screw slider mechanism and a servo motor. By moving a slider, the adjustment of a center of gravity of the AUV can be achieved. The device is used for compensating for the influence of the underwater manipulator on the longitudinal change of the center of gravity of the AUV during the movement, thereby achieving the attitude stability of the AUV.

The following description places emphasis on the operation type AUV. Since the AUV has a built-in energy module, the energy saving and resistance reduction of its shape must be considered. However, during the operation of the operation type AUV, it needs to hover stably under complex sea conditions, which in fact increases its own resistance.

A manipulator of the traditional operation type AUV is directly mounted outside a body and close to a bow. The manipulator is greatly affected by hydrodynamic force as a whole due to its complex structure, and the higher the speed, the larger the resistance, so that the cruising speed is difficult to increase, and meanwhile energy consumption may be increased. Thus, the traditional operation type AUV has poor endurance, its operation range is not wide enough, and the energy consumption is also relatively high.

Technical Problem

The present disclosure aims at providing an unmanned cable-free operation autonomous underwater vehicle with better properties.

Technical Solution

The above technical objective of the present disclosure is achieved by the following technical solutions: an unmanned cable-free operation autonomous underwater vehicle includes a bow, a middle and a stern, each of which is of a hollow structure, the middle is provided with a manipulator lifting device and a cabin door opening and closing mechanism, the bow is provided with a first horizontal channel propeller and a first vertical channel propeller, and the stern is provided with two second vertical channel propellers and four main propellers.

In an embodiment, the manipulator lifting device includes a fixed base mounted in the middle, the fixed base is mounted with a push rod capable of stretching up and down, a lower end of the push rod is connected with a manipulator, and guide shafts penetrating through the fixed base up and down, lower ends of the guide shafts are fixedly connected to a top of the manipulator.

In an embodiment, four guide shafts are provided, and the four guide shafts are circumferentially distributed on a periphery of the push rod at equal intervals.

In an embodiment, the stern includes a base part fixed with an upper vertical tail, a left horizontal tail, a lower vertical tail and a right horizontal tail at an outer wall of the base part, the tails are circumferentially distributed at equal intervals and respectively provided with one main propeller.

In an embodiment, the left horizontal tail fin and the right horizontal tail fin are further respectively provided with one second vertical channel propeller, and the second vertical channel propellers are located on front sides of the main propellers.

In an embodiment, an upper side edge of the upper vertical tail, a left side edge of the left horizontal tail, a lower side edge of the lower vertical tail and a right side edge of the right horizontal tail are respectively and integrally connected with a wing-edge-reinforced guide spindle-shaped fin stretching in a fore-and-aft direction.

In an embodiment, a length of the bow is 750-1,000 mm, a ratio of the length of the bow to a length of the middle is 0.3 to 0.6, and a ratio of a length of the stern to the length of the middle is 0.7 to 1.0.

In an embodiment, the cabin door opening and closing mechanism comprises a drive motor mounted in the middle, the drive motor is mounted with a crank, a tail end of the crank is mounted with a rocker, another end of the rocker is connected to a cabin door, four corners of the cabin door are limited in sliding rails, the sliding rails are fixedly mounted in the middle; when the cabin door is closed, the crank and the rocker are collinear and make the cabin door closed, and when the cabin door is opened, the crank and the rocker are collinear again and keep the cabin door in an opened state.

In an embodiment, a counterweight module is mounted at a position, on a periphery of the cabin door, in the middle.

In an embodiment, the counterweight module includes strip-shaped guide lead pigs circumferentially distributed on the periphery of the cabin door at equal intervals in a scattered pattern, and guide grooves for draining moving water flow when the cabin door is opened or closed are formed between the adjacent strip-shaped guide lead pigs.

Beneficial Effects

Beneficial effects of the present disclosure: the manipulator of the AUV of the present disclosure is mounted on a telescopic platform, the cabin door is mounted therebelow. During cruising, the manipulator retracts into the AUV and the cabin door is closed, so as to keep a streamline form to reduce water resistance; during operation, the manipulator stretches out through an undercarriage, an operation space of the manipulator is ensured accordingly. In order to improve the operation capacity of the AUV when hovering stably, the manipulator is designed near a center of gravity of the AUV, so that the energy consumption of the AUV can be saved, and meanwhile the resistance for the AUV to hover stably can be improved.

Furthermore, since the middle of the manipulator of the AUV is provided with an opening creatively, compared with a traditional front operation type AUV, during operation of the manipulator with the same length, the operation range of the manipulator of the AUV is remarkably widened. The operation type AUV mainly inspects underwater submarine cables. The submarine cables are usually laid under the sea, which are located under a body of the AUV, so that the operation range of the operation type AUV is further widened.

The manipulator stretches and retracts and rotates back and forth during operation of the AUV of the present disclosure, the manipulator and the AUV are difficult to stabilize, in order to avoid this condition, one and two vertical propeller structures are sequentially and additionally arranged on the bow and the stern during design and cooperate with the unique tail design, so as to comprehensively control a pitch angle, a roll angle and a sideward heeling angle of the AUV, thereby improving the effect of stabilizing the AUV.

DETAILED DESCRIPTION OF THE EMBODIMENTS

The following specific embodiments only explain the present disclosure instead of limiting it, those skilled in the art can make modifications without inventive contributions to the embodiments according to requirements after reading the specification, but the modifications are protected by patent laws as long as they fall within the scope of the claims of the present disclosure.

As shown in FIGS. 1-9, an unmanned cable-free operation type autonomous underwater vehicle includes a bow 1, a middle 2 and a stern 3. Each of the bow 1, the middle 2 and the stern 3 is of a hollow structure. The middle 2 is provided with a manipulator lifting device and a cabin door opening and closing mechanism, the bow 1 is provided with a first horizontal channel propeller 11 and a first vertical channel propeller 12, and the stern 3 is provided with two second vertical channel propellers 31 and four main propellers 32. The embodiment differs from the prior art in that the manipulator lifting device with an operation type manipulator is arranged at the middle 2, and preferably arranged at middle of the middle 2 in a front-and-back direction, which can retract to be stored in an internal space of the middle, and can also stretch out of the middle to operate, so that compared with the condition in the prior art that a manipulator is arranged outside a cabin, a lifting range may be wide, an operation range may be wider, and a movement range of the manipulator may be wide accordingly. By means of the design of the above propellers, this problem can be effectively solved, and a high stabilizing effect can be achieved.

Figure 5:
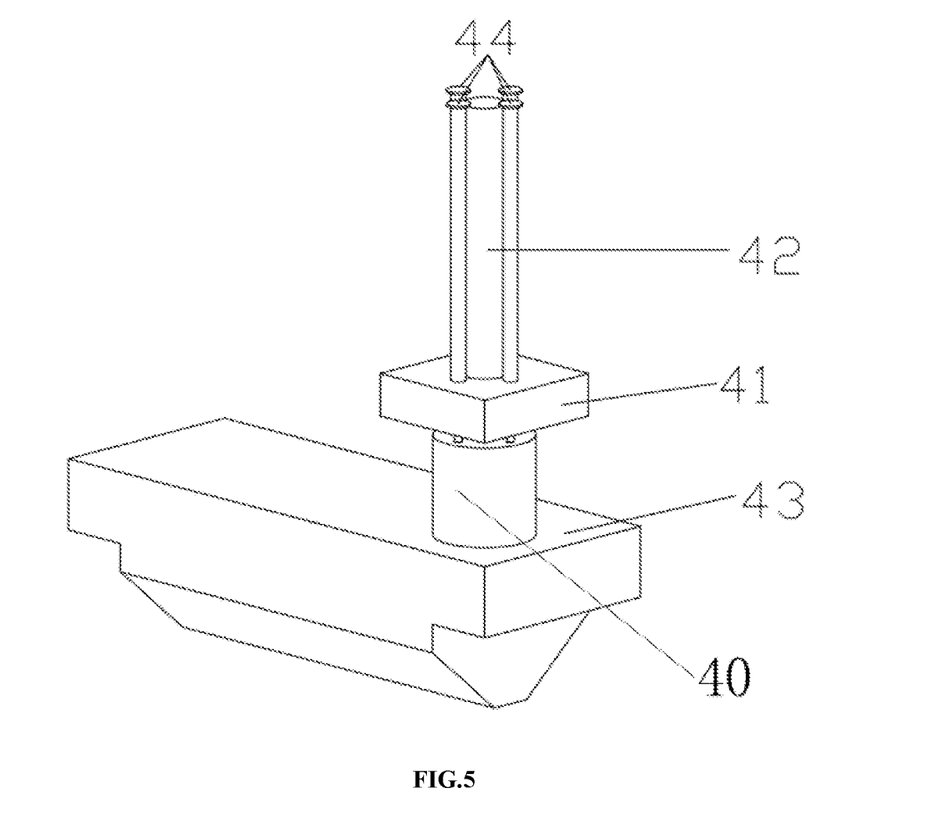
FIG. 5 is a schematic diagram of a stereostructure of a manipulator lifting device of an AUV in an embodiment.

Furthermore, the manipulator lifting device includes a fixed base 41 mounted in the middle 2, the fixed base 41 is mounted with a push rod 42 capable of stretching up and down. A lower end of the push rod 42 is connected to a manipulator 43 and guide shafts 44 penetrating through the fixed base 41 up and down, wherein lower ends of the guide shafts are fixedly connected to a top of the manipulator 43. The fixed base 41 may be fixed to an inner wall of the middle 2 through a rectangular steel plate and other structures, for example, a fixing rod is fixedly connected therebetween and the like. The push rod 42 penetrates through the fixed base 41 up and down and can get telescopic up and down, the push rod 42 may be driven by a cylinder mounted in the middle and the like to move up and down, a lower end of the push rod 42 may drive the manipulator 43 to move up and down. The push rod 42 itself may be a cylinder and other lifting equipment, after its piston rod penetrates through the fixed base 41 downwards, the lower end of the push rod is connected with the manipulator, and these manners may be achieved. In order to achieve lifting stability, the guide shafts 44 also need to be arranged, the guide shafts also penetrate through the fixed base 41 up and down, tops of the guide shafts need to be connected with limiting heads with diameters greater than those of main bodies of the guide shafts. As hole structures with diameters consistent with those of the main bodies of the guide shafts 44 will be formed in the fixed base 41, the limiting heads can perform limit on upper sides of the guide shafts at these holes, thereby preventing the guide shafts 44 from falling down out of the fixed base 41.

Preferably, there are four guide shafts 44, and the four guide shafts are circumferentially distributed on a periphery of the push rod 42 at equal intervals. If there are four guide shafts 44, a square structure arranged in a matrix is formed, so that the structure is relatively stable.

Figure 6:
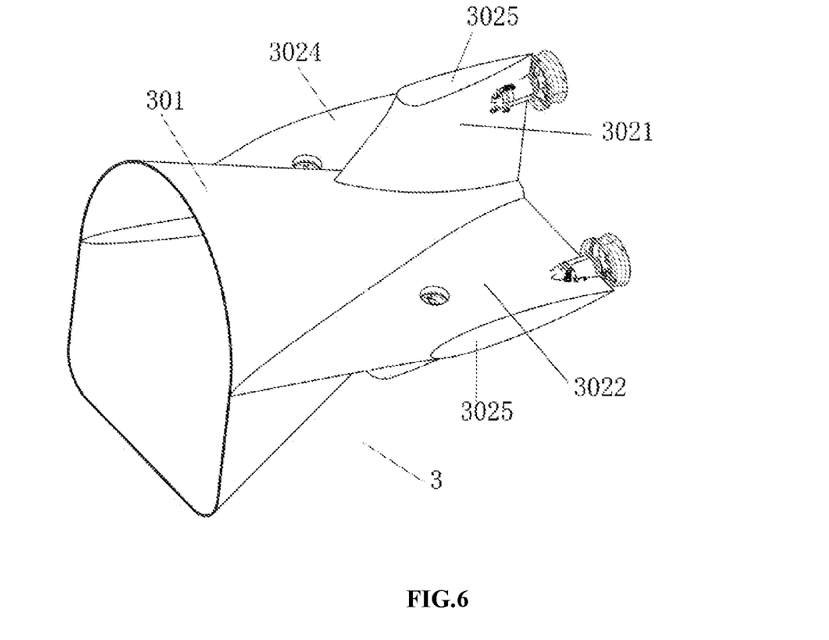
FIG. 6 is a schematic diagram of a stereostructure of a stern of an AUV in an embodiment.

Preferably, the stern 3 includes a base part 301, an outer wall of the base part 301 is fixed with an upper vertical tail 3021, a left horizontal tail 3022, a lower vertical tail 3023 and a right horizontal tail 3024, the upper vertical tail 3021, the left horizontal tail 3022, the lower vertical tail 3023 and the right horizontal tail 3024 are circumferentially distributed at equal intervals and respectively provided with one main propeller 32. The four tails are also of a square structure arranged in a matrix. The main propeller 32 of the upper vertical tail fin 3021 is located at the upper of the rear portion thereof, the main propeller 32 of the left vertical tail 3022 is located at the left of the rear portion thereof, the main propeller 32 of the lower vertical tail 3023 is located at the bottom of the rear portion thereof, and the main propeller 32 of the right vertical tail 3024 is located at the right of the rear portion thereof. The main propellers 32 may also be channel propellers, however, are oriented to propel and retreat in a front-and-back direction.

Furthermore, the left horizontal tail fin 3022 and the right horizontal tail fin 3024 are further respectively provided with one second vertical channel propeller 31, and the second vertical channel propellers 31 are located on front sides of the corresponding main propellers 32. Preferably, the second vertical channel propellers 31 on the left horizontal tail 3022 and the right horizontal tail 3024 are both arranged at positions of centers of gravity thereof, and the second vertical channel propellers 31 operate vertically, that is, propel and retreat in an up-and-down direction.

In the above structure, the left horizontal tail fin 3022 and the right horizontal tail fin 3024 and connecting structures thereon are preferably of left-and-right mirror symmetry. Similarly, the structural design of the upper vertical tail 3021 and the lower vertical tail 3023 is preferably of up-and-down symmetry. Further preferably, an upper side edge of the upper vertical tail 3021, a left side edge of the left horizontal tail 3022, a lower side edge of the lower vertical tail 3023 and a right side edge of the right horizontal tail 3024 are respectively and integrally connected with a wing-edge-reinforced guide spindle-shaped fin 3025 stretching in a fore-and-aft direction. By means of the wing-edge-reinforced guide spindle-shaped fins 3025, the structural strength of wing edges is improved, and meanwhile, the force-bearing area of the edges is increased, so that the controllability is better during underwater operation, and the effects of stable driving and precise hovering can be better achieved.

Figure 1:
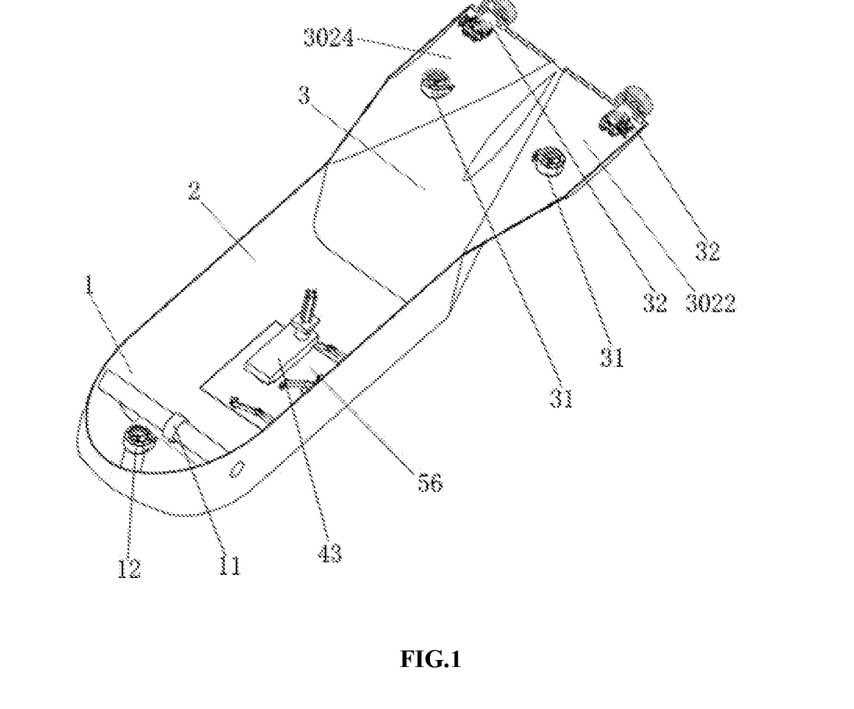
FIG. 1 is a schematic diagram of a stereostructure of an AUV with an upper portion opened in an embodiment.
Figure 2:
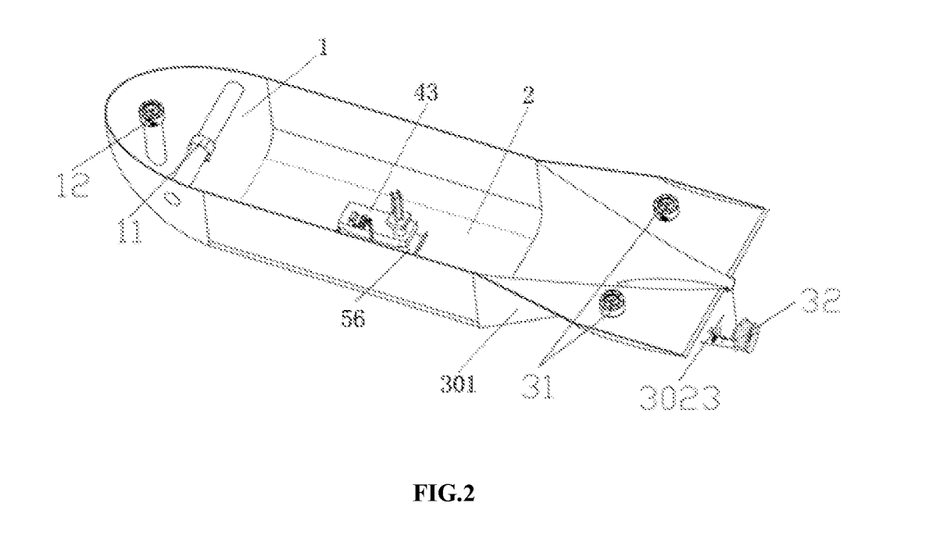
FIG. 2 is a schematic diagram of the stereostructure of FIG. 1 in another view.
Figure 3:
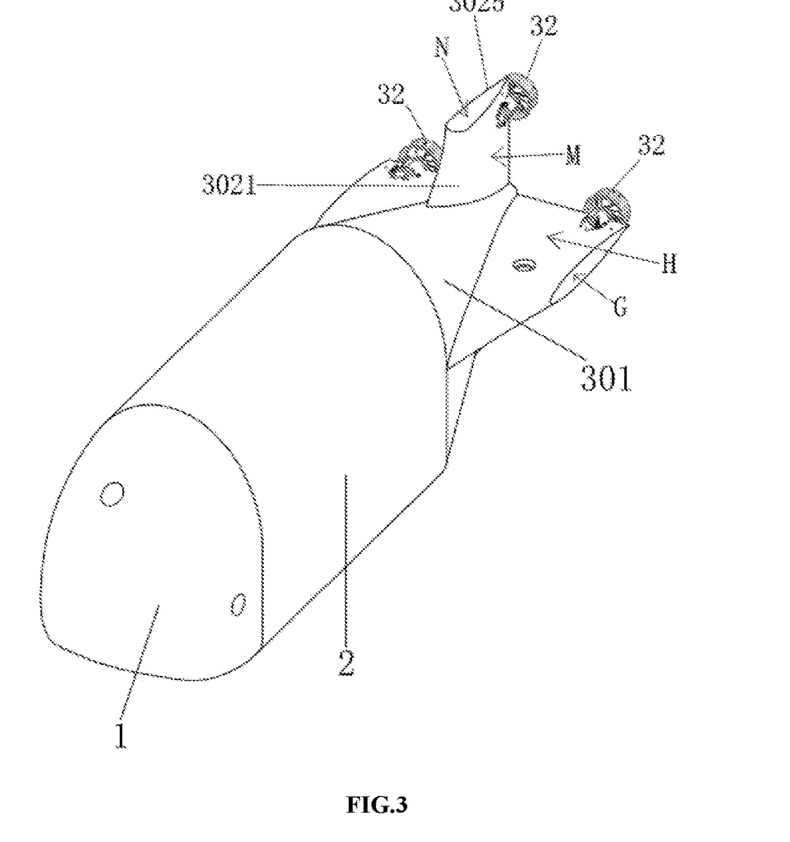
FIG. 3 is a schematic diagram of a stereostructure of an integral external contour of an AUV in an embodiment.

In addition, there are some requirements for size design. It is attempted to keep a length of the bow 1 at 750-1,000 mm, a ratio of the length of the bow 1 to a length of the middle 2 at 0.3 to 0.6, and a length of the stern 3 to the length of the middle 2 at 0.7 to 1.0. The structural designs of the sizes are more conducive to implementing the AUV in the embodiment.

Figure 4:
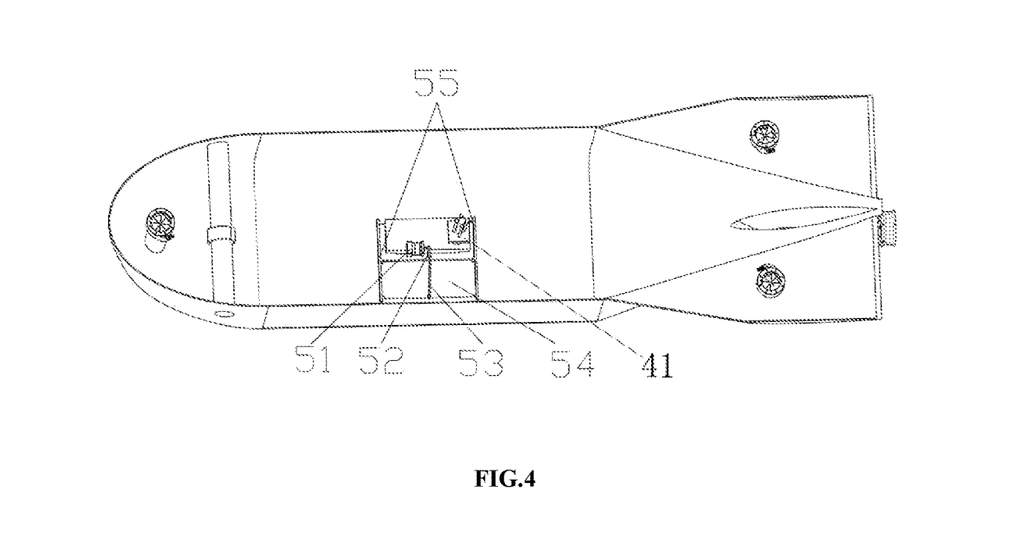
FIG. 4 is a schematic diagram of a specific structure of a cabin door opening and closing mechanism of an AUV in an embodiment.

Specifically, the cabin door opening and closing mechanism includes a drive motor 51 mounted in the middle 2, the drive motor is mounted with a crank 52,t a tail end of the crank 52 is mounted with a rocker 53, the other end of the rocker 53 is connected to a cabin door 54, and four corners of the cabin door 54 are limited in the sliding rails 55, the sliding rails 55 are fixedly mounted in the middle 2. When the cabin door 54 is closed, the crank 52 and the rocker 53 are collinear and make the cabin door 54 closed; and when the cabin door 54 is opened, the crank 52 and the rocker 53 are collinear again and keep the cabin door 54 in an opened state. Specifically, when the cabin door 54 is closed and the crank 52 and the rocker 53 are collinear, the cabin door 54 is closed by a dead point formed by a link mechanism consisting of the crank 52 and the rocker 53; and when the cabin door 54 is opened and the crank 52 and the rocker 53 are collinear again, the link mechanism returns to the dead point again, so that the cabin door 54 is kept in the opened state. The cabin door 54 may move left and right, a size of an aperture of the cabin door formed in the middle 2 needs to be less than or equal to that of the cabin door. The sliding rails 55 are arranged on front and back sides respectively and stretch left and right, and left-and-right sizes of the sliding rails 55 need to be greater than the left-and-right size of the cabin door, so that the cabin door can have an enough left-and-right movement space to close the aperture of the cabin door, and when opened, the cabin door can be stored at positions, not located at the aperture 56 of the cabin door, of the sliding rails 55. The cabin door opening and closing mechanism may adopt other existing door opening and closing structures.

A specific embodiment is introduced below:

An unmanned cable-free operation type autonomous underwater vehicle includes a bow 1, a middle 2 and a stern 3, and each of the bow 1, the middle 2 and the stern 3 is of a hollow structure. The bow, the middle and the stern of the present disclosure are of the hollow structures, so as to ensure balanced internal and external pressure, and the AUV of the present disclosure can be usually applied to water with a depth being 500 m. A length of the bow is 750-1,000 mm, the length in the embodiment is a size from the bow 1 to the stern 3 in a front-and-back direction, and a width is a left-and-right size. A horizontal section of the bow is a semiellipse, its long axis a is 2*A, which is in an up-and-down direction, and its short axis b is 1.2*A to 1.5*A, which is in a left-and-right direction. A section of a joint of the bow and the middle is of a curved structure with an upper portion being a semiellipse and a lower portion being a rectangle, a long axis c of the semiellipse is 1.3*A to 1.7*A, which is in the up-and-down direction, a short axis d is equal to b, which is in the left-and-right direction, a width e of the rectangle is equal to d, and a height f of the rectangle is equal to c/2. A ratio A/B of a length B of the middle to the length A of the bow is 0.3 to 0.6. The middle is a hollow column with a section with an upper portion being a semiellipse and a lower portion being a rectangle, a long axis of the semiellipse is c, which is an up-and-down direction, a short axis is d, which is the left-and-right direction, a width of the rectangle is also e, and a height of the rectangle is also f. A ratio C/B of a length C of the stern to the length B of the middle is 0.7 to 1.0. Four tails are distributed on an outer wall of the stern at an equal interval of 90°, which are an upper vertical tail 3021, a left horizontal tail 3022, a lower vertical tail 3023 and a right horizontal tail 3024 respectively. Front-and-back lengths of the left horizontal tail 3022 and the right horizontal tail 3024 are both 0.3*B to 0.5*B, an interval between the leftmost side of the left horizontal tail 3022 and the rightmost side of the right horizontal tail 3024 is 0.6*B to 0.7*B, an inclination angle between an edge on a left front portion of the left horizontal tail 3022 and a front-and-back stretching direction is 5° to 15°, and an inclination angle between an edge on a right front portion of the right horizontal tail 3024 and the front-and-back stretching direction is 5° to 15°. Front-and-back lengths of the upper vertical tail 3021 and the lower vertical tail 3023 are both 0.2*B to 0.4*B, an interval between the uppermost side of the upper vertical tail 3021 and the lowest side of the lower vertical tail 3023 is 0.6*B to 0.7*B, an inclination angle between a front side edge of the upper vertical tail 3021 and the front-and-back stretching direction is 30° to 60°, and an inclination angle between a front side edge of the lower vertical tail 3023 and the front-and-back stretching direction is 30° to 60°.

A first vertical channel propeller 12 is mounted on the bow at ⅓ in the direction from the bow to the stern, that is, a ⅓ of a length from front to back. A first horizontal channel propeller 11 is mounted on the bow at 7/10 of the length from front to back, that is, the horizontal propeller is further back.

The manipulator lifting device includes a fixed base 41, a push rod 42, guide shafts 44 and a manipulator 43. The fixed base 41 is fixed to a ⅗ of a length from front to back of the middle; the push rod 42 is mounted on the fixed base 41, and a through hole concentric with the push rod 42 and allowing the push rod 42 to penetrate through is formed in the fixed base 41. The guide shafts 44 are concentric with holes in a periphery of the fixed base 41 and penetrate through these holes up and down, and lower ends of the guide shafts 44 are fixed to the manipulator. The manipulator is provided with a cylindrical pedestal 40 which is concentric with the push rod 42 and fixedly connected with a lower end of the push rod 42. When the manipulator 43 is received in the middle, an interval between the lowest end of the manipulator 43 and the closed cabin door 5 is preferably 0.03*B.

Each of second vertical channel propellers 31 is preferably arranged at ⅗ of a length from front to back of the stern, and an interval between the corresponding second vertical channel propeller 31 of the left horizontal tail 3022 and the corresponding second vertical channel propeller 31 of the right horizontal tail 3024 is preferably 0.75*B. In addition, four main propellers are distributed at tail ends of the four tails, an interval between the corresponding main propeller 32 of the left horizontal tail 3022 and the corresponding main propeller 32 of the right horizontal tail 3024 is preferably 0.53*B, and an interval between the corresponding main propeller 32 of the upper horizontal tail 3021 and the corresponding main propeller 3 of the lower horizontal tail 3023 is also preferably 0.53*B.

The overall length and the space of the middle of the present disclosure may be adjusted according to the quantity of loading equipment, and overall energy consumption may be estimated according to working time and cruising time of sensors, so as to determine a reasonable battery carrying volume. On one hand, the cuboid-like design of the middle is conducive to carrying the sensors, a battery, a control device and the like, and on the other hand, it can also improve the stability of the autonomous underwater vehicle. The horizontal and vertical tails of the stern are conducive to keeping the attitude stability during high-speed cruising, and conducive to making the autonomous underwater vehicle rapidly aligned with an incoming flow direction during operation. An example of a specific adjusting manner is as follows: assuming that ocean currents in an operation area are located above a left side of the operation type autonomous underwater vehicle, impact force borne by a surface M of the upper vertical tail 3021 will be greater than that borne by a surface N, the surface M is a left side face, the surface N is a surface of the wing-edge-reinforced guide spindle-shaped fin 3025. At this moment, the operation type autonomous underwater vehicle will rotate around its specific rotary axis till the surface M and the surface N of the tail are subjected to the same force. Meanwhile, impact force borne by a surface H of the left horizontal tail 3022 is greater than that borne by a surface G, the surface H is an upper side face, the surface G is a surface of the wing-edge-reinforced guide spindle-shaped fin 3025, and the operation type autonomous underwater vehicle will rotate around its specific rotary axis till the surface H and the surface G of the tail are subjected to the same force. When the forces borne by the surface M and the surface N are the same, and the forces borne by the surface H and the surface G are the same, the bow of the operation type autonomous underwater vehicle will be aligned with the incoming flow direction of the ocean currents, part of thrust of the main propellers will be used for inducing resistance to the ocean currents, and the rest of the thrust is used for navigating the autonomous underwater vehicle to the operation area. The three-point type vertical channel propellers can easily ensure the hovering precision of the autonomous underwater vehicle during operation, and their working manner is as follows: after the operation type autonomous underwater vehicle reaches an operation range, the three vertical channel propellers generate thrust to make the operation type autonomous underwater vehicle reach a designated depth, when the manipulator stretches out of a cabin to work, the position of a center of gravity of the operation type autonomous underwater vehicle changes, rolling moment is generated by gravity and buoyancy due to a position difference between the center of gravity and the center of buoyancy, at this moment, and the two vertical channel propellers of the horizontal tails reversely increase the same thrust to offset the rolling moment generated by the change in the center of gravity, to keep the operation attitude of the operational autonomous underwater vehicle.

Figure 7:
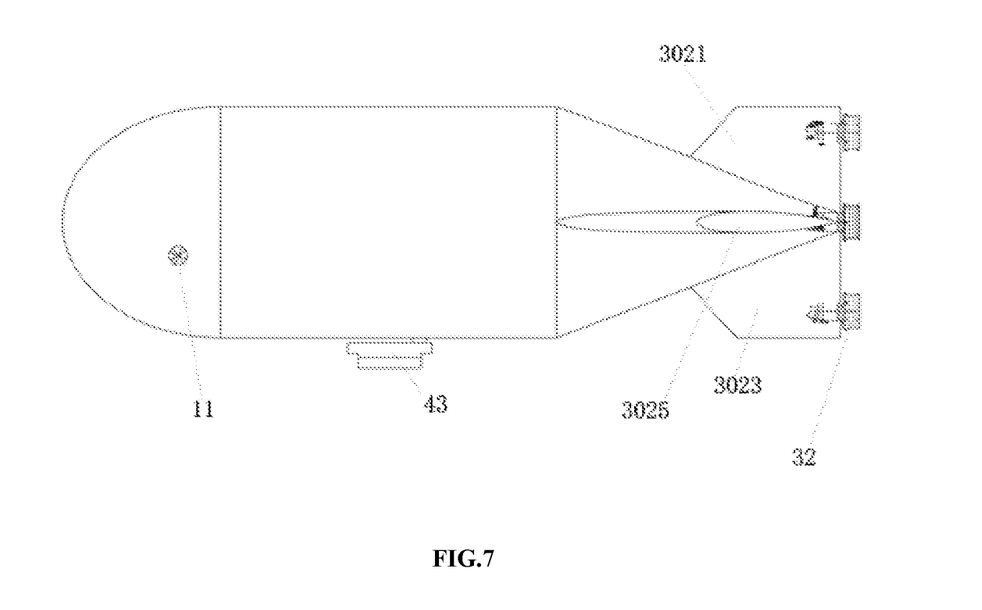
FIG. 7 is a left view of the AUV in FIG. 3 after a manipulator stretches out of a cabin.
Figure 8:
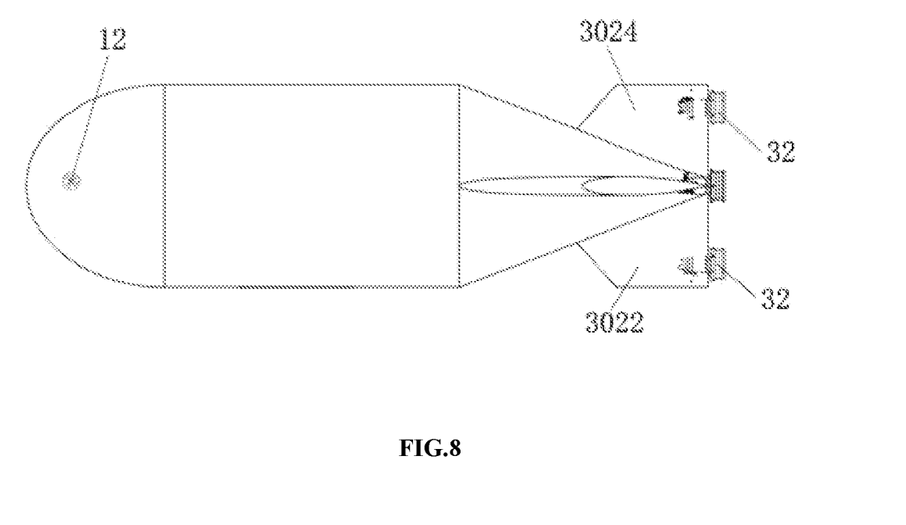
FIG. 8 is a top view of the structure in FIG. 7.

The operation type autonomous underwater vehicle in the present disclosure is designed into slightly positive buoyancy and submerges by means of power. During high-speed cruising, the specific curved design of the bow and the smooth shape of the middle are conducive to reducing resistance during cruising, and the horizontal and vertical tails of the bow can improve the stability. During operation, the horizontal and vertical tails of the bow are conducive to making the autonomous underwater vehicle rapidly aligned with the direction of the ocean currents, and the main propellers are used for inducing resistance to the ocean currents. The manipulator stretches out of the middle, so as to widen the operation range, and the three-point type vertical channel propellers can ensure the hovering height and hovering stability.

Figure 9:
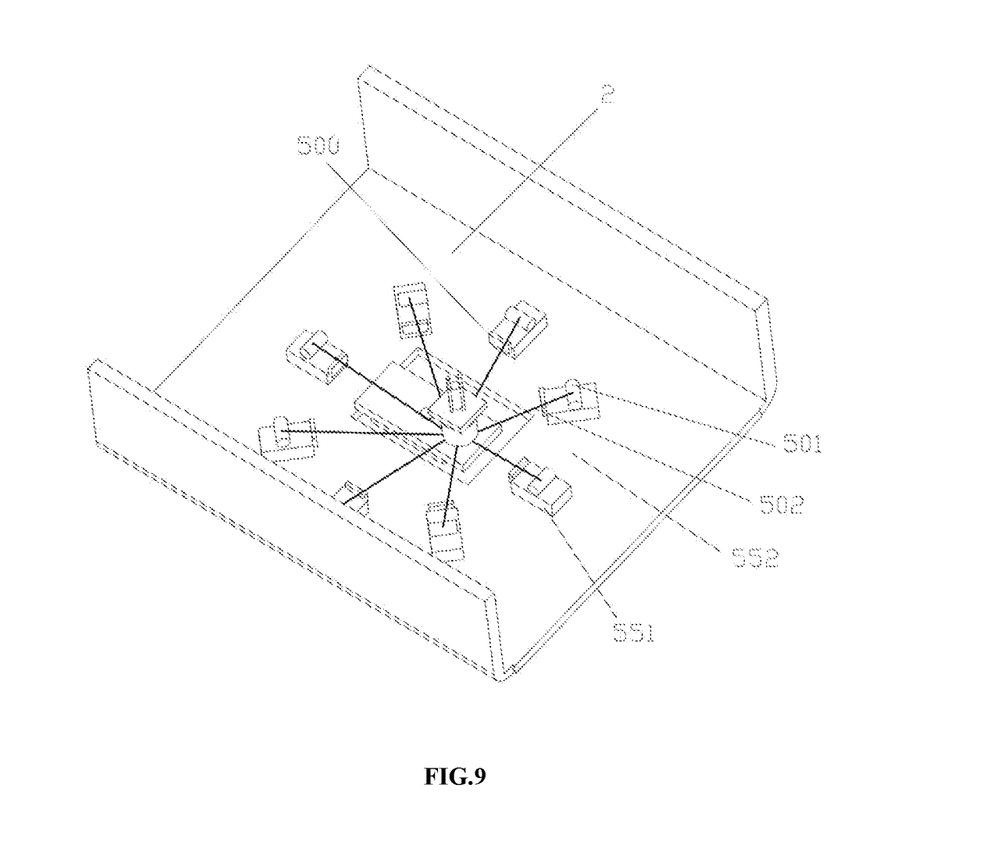
FIG. 9 is a schematic diagram of a stereostructure of a middle, provided with an optimized counterweight module, of an AUV.

Further preferably, a counterweight module is mounted on a periphery of the cabin door 54 in the middle 2. The following is firstly described here, most of the autonomous underwater vehicle is permeable, that is, water may exist in the AUV, and so does the AUV of the present disclosure, which is permeable. However, even for the AUV like this, as after the cabin door is opened, especially, during lifting or operation of the manipulator, water may be driven to move by the manipulator due to a wide movement range, and the moving water flow may affect the stability of the AUV, and especially, greatly affect hovering. Accordingly, the influence of the water flow caused by the movement of the manipulator can be effectively relieved by arranging the counterweight module at the position, thereby better improving the stability.

Yet furthermore, the counterweight module includes strip-shaped guide lead pigs 551 circumferentially distributed on the periphery of the cabin door 54 at equal intervals and are in a scattered pattern. Guide grooves 552 for draining the moving water flow when the cabin door is opened or closed are formed between the adjacent strip-shaped guide lead pigs 551, and the driven moving water flow can uniformly diffuse to the periphery by means of the guide grooves 552, thereby ensuring the stability of the AUV as much as possible. More preferably, cushioning pads 500, such as sponge and other porous structures, are fixed to surfaces of the strip-shaped guide lead pigs 551, so as to relieve the influence of the moving water flow. More preferably, pay-off rollers 501 are mounted and connected on the strip-shaped guide lead pigs 551, which can revolve, for example, the pay-off rollers are mounted on the strip-shaped guide lead pigs 551 through torsional spring structures, or other existing roller structures capable of making the pay-off rollers 501 revolve after rotating are available, and most preferably, the torsional springs with a buffering property are arranged in a rotating direction. Then, wire bodies 502 of stainless steel wires or other nylon wires or elastic wires are wound around the pay-off rollers, one end of each wire body 502 is wound around the corresponding pay-off roller 501, and the other end is a pulled-out wire end connected with the manipulator, so that the manipulator is dragged by the wire bodies during lifting and operation. The manipulator is guided by the guide shafts, driven by the push rod and also dragged by the wire bodies on peripheries of cabin door holders, so as to form a stereoscopic support and telescopic drive mechanism, such that actions of the manipulator may be more stable, and the structure of the whole AUV is also more stable accordingly, thereby achieving a better hovering effect. Of course, the pay-off rollers 501 need to ensure the pay-off smoothness, without affecting the rotation of the manipulator during lifting and operation. The wire ends of the wire bodies 502 may be mounted and connected on the pedestal of the manipulator.

The above descriptions are merely specific implementations of the present disclosure, which are not intended to limit the protection scope of the present disclosure. All equivalent modifications or replacements which are easily conceived by those skilled in the art within the technical scope disclosed by the present disclosure should fall within the protection scope of the present disclosure. Thus, the protection scope of the present disclosure should follow the protection scope of the claims.

What is claimed is:

1. An unmanned cable-free operation type autonomous underwater vehicle, comprising a bow, a middle and a stern, wherein each of the bow, the middle and the stern is of a hollow structure; the middle is provided with a manipulator lifting device and a cabin door opening and closing mechanism, the bow is provided with a first horizontal channel propeller and a first vertical channel propeller, and the stern is provided with two second vertical channel propellers and four main propellers.

2. The unmanned cable-free operation type autonomous underwater vehicle according to claim 1, wherein the manipulator lifting device comprises a fixed base mounted in the middle, the fixed base is mounted with a push rod capable of stretching up and down, a lower end of the push rod is connected with a manipulator, and guide shafts penetrating through the fixed base up and down, lower ends of the guide shafts are fixedly connected to a top of the manipulator.

3. The unmanned cable-free operation type autonomous underwater vehicle according to claim 2, wherein four guide shafts are provided and are circumferentially arrayed on a periphery of the push rod.

4. The unmanned cable-free operation type autonomous underwater vehicle according to claim 2, wherein the stern comprises a base part fixed with an upper vertical tail, a left horizontal tail, a lower vertical tail and a right horizontal tail at an outer wall of the base part; the upper vertical tail, the left horizontal tail, the lower vertical tail and the right horizontal tail are circumferentially distributed at equal intervals and respectively provided with one main propeller.

5. The unmanned cable-free operation type autonomous underwater vehicle according to claim 4, wherein the left horizontal tail and the right horizontal tail are further respectively provided with one second vertical channel propeller, and the second vertical channel propellers are located on front sides of the main propellers.

6. The unmanned cable-free operation type autonomous underwater vehicle according to claim 1, wherein a length of the bow is 750-1,000 mm, a ratio of the length of the bow to a length of the middle is 0.3 to 0.6, and a ratio of a length of the stern to the length of the middle is 0.7 to 1.0.

7. The unmanned cable-free operation type autonomous underwater vehicle according to claim 1, wherein a counterweight module is mounted at a position, on a periphery of the cabin door, in the middle.

8. The unmanned cable-free operation type autonomous underwater vehicle according to claim 7, wherein the counterweight module comprises strip-shaped guide lead pigs circumferentially distributed on the periphery of the cabin door at equal intervals and are in a scattered pattern, and guide grooves for draining moving water flow when the cabin door is opened or closed are formed between the adjacent strip-shaped guide lead pigs.

* * * * *